Patented Mar. 26, 1946

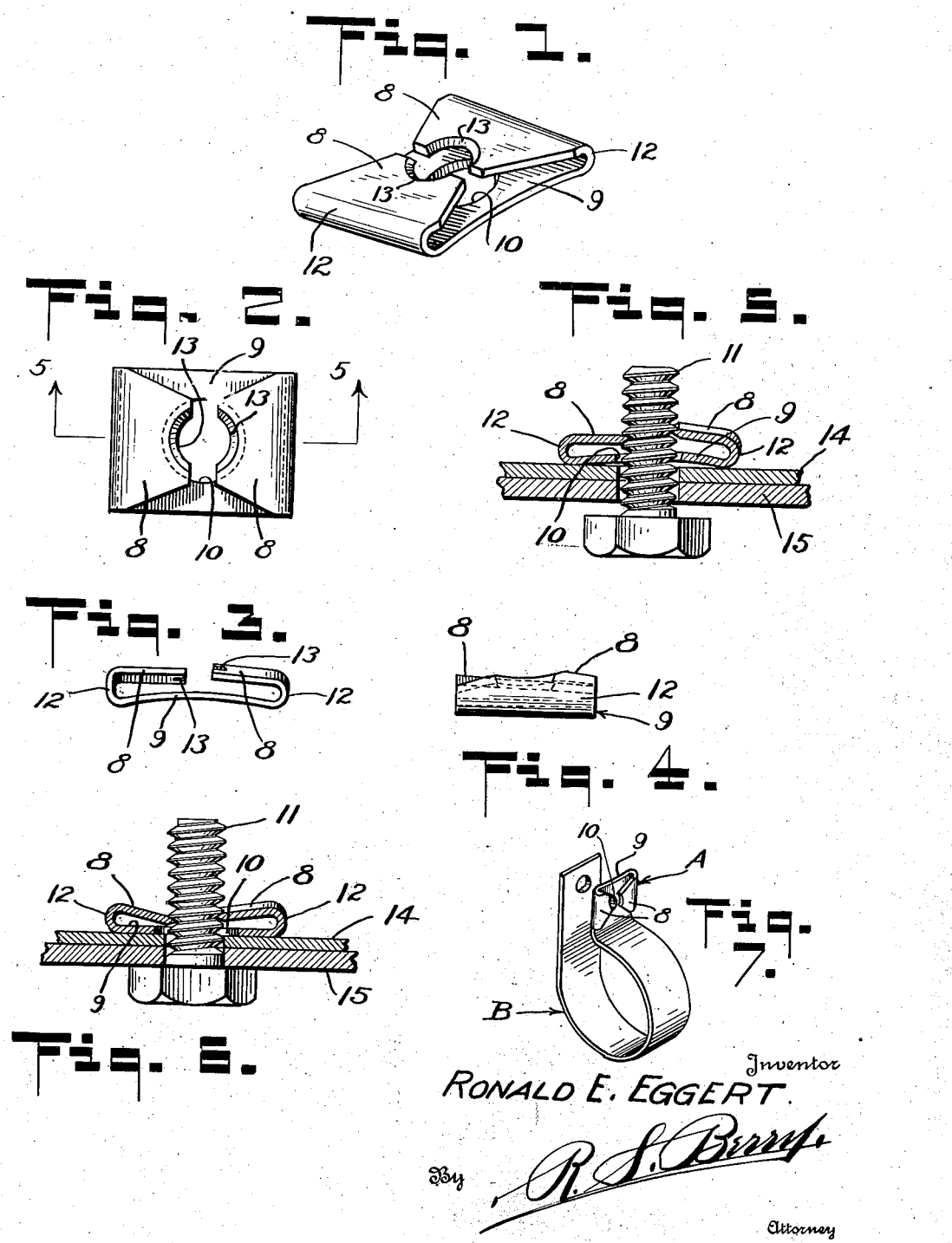

2,397,251

UNITED STATES PATENT OFFICE 2,397,251

LOCK NUT

Ronald Edgar Eggert, Burbank, Calif., assignor to Adel Precision Products Corp., a corporation of California Application November 29, 1944, Serial No. 565,716

2 Claims. (Cl. 85—36)

This invention relates to "threadless" spring nuts of the self-locking type in which a resilient body or base is provided with opposed resilient tongues for threadedly engaging a bolt or like fastening so as to lock the nut thereon and hold the bolt or fastening thereon.

An object of the present invention is to provide a nut of the character described which embodies improvements over similar nuts in point of simplicity of construction, ease and inexpensiveness of manufacture, added spring action, a more reliable locking action, durability and ability to remain securely in place under vibratory and other forces which would otherwise loosen the nut.

Another object of this invention is to provide a nut such as above described in which the body or base portion as well as the spring bolt-engaging tongues integral therewith are constructed and arranged to cause said tongues to increasingly bind against the bolt under the spring action of the nut as a whole.

Another object of my invention is to provide a nut such as described in which the body portion thereof is preformed with an outward bow to increase the locking action of the nut against the bolt.

A further object is to provide a nut construction such as described which may be embodied as a part of a larger member than the body or base proper of the nut as, for example, in the end of a conduit clip or in any part of any other sheet metal member of larger area than required to form the body or base of the nut.

With the foregoing objects in view, together with such other objects and advantages as may subsequently appear, the invention resides in the parts and in the combination, construction and arrangement of parts as hereinafter described and claimed, and as illustrated by way of example in the accompanying drawing, in which:

Fig. 1 is a perspective view of a nut embodying this invention;

Fig. 2 is a top plan view of the nut;

Fig. 3 is a side elevation of the nut;

Fig. 4 is an end elevation of the nut;

Fig. 5 is a sectional view taken on the line 5—5 of Fig. 2 showing the nut applied to a bolt and as the nut and bolt would appear before being tightened;

Fig. 6 is a view similar to Fig. 5 showing the nut and bolt as when tightened;

Fig. 7 is a perspective view showing one way of embodying the nut hereof in a larger sheet metal member than required for the base of the nut, such a member being in this instance a conduit supporting clip.

Referring to the accompanying drawing more specifically it will be seen that one embodiment of my improved nut is made from a single piece or strip of resilient strap metal or resilient sheet metal bent back on itself to provide opposed resilient tongues 8 and a substantially rectangular base or body portion 9. This body portion is provided with a central opening 10 for free reception of a bolt or like threaded member 11 so that the tongues 8 may have threaded engagement with such bolt or member.

The tongues 8 are joined to the opposite ends of the base 9 by means of curved bends 12 each preferably having a radius equal to approximately twice the thickness of the base. As here shown these tongues overlie the base in end to end relation and are provided at their spaced and opposed free ends with arcuate bolt-engaging edges 13.

In order that the edges 13 will be disposed at the proper helix angle for effecting a screw threaded engagement with the bolt, the tongues 8 are inclined or canted transversely thereof in opposite directions also inclined outwardly toward their free ends.

For the purpose of increasing the locking action of the edges 13 against the bolt the body or bore 9 is bowed outwardly toward the tongues 8 between its ends and will therefore seat at its ends only on one of the two members 14 and 15 through which the bolt is extended, upon the initial contact of the nut with said one member as shown in Fig. 5.

Fig. 5 shows how the nut is applied to the bolt so that the latter may be tightened to secure the members 14 and 15 together, it being noted that before tightening the bolt, the threaded engagement of the edges 13 with the bolt causes the tongues 8 and the base 9 to be flexed so as to exert a spring force urging the edges 13 into closer and tighter threaded engagement with the threads of the bolt as the bolt is screwed-in or as the nut is screwed-in on the bolt. This tightening engagement of the edges 13 with the bolt increases as the bolt or nut is screwed-in, the tongues being flexed inwardly toward the base and the base tending first to bow further outwardly until the tongues move past a position of substantially parallelism with the base and assume the final locking position such as that shown in Fig. 6. In this final position the tongues are inclined inwardly from the bends 12 towards their free ends and force exerted thereby against the base 9 in moving the tongues 8 into such final locking position with their ends lying close to the base, causes the base to be flattened out as shown in Fig. 6, and the edges 13 to bite into the bolt and lock the nut thereon under a spring force and in such manner that loosening of the nut and bolt is effectively prevented and the bolt is therefore reliably held in place.

It should be noted that the tongues are flexed both longitudinally and transversely as well as bent inwardly toward the base, and the resilient bends 12, resilient tongues 8 and resilient base 9 are all flexed to the extent that the entire nut exerts an effective spring force urging the edges 13 tightly against the bolt locking the nut and bolt together.

Fig. 7 shows a nut structure A identical with that shown in Figs. 1 to 6 inclusive except that it is formed on the end of a conduit supporting clip B. In view of this arrangement it is apparent that the nut hereof may be formed in various sheet and strap metal members of larger area or extent than required to form the base portion of the nut itself.

It should be noted that the nut hereof is of such formation as to be applied and tightened by means of a wrench if desired.

The edges 13 may be chamfered to adapt the nut to fine V-type threads as on machine screw. However, for other type threads the edges may be left square.

An important feature of the nut hereof is that it exerts a yielding or spring action axially of the bolt thereby subjecting the members held by the bolt and nut to a yielding compression and securely holding them together when the nut is tightened. This action together with the distortion of the body or base caused by the coaction of the bolt and the tongues sets up a force such that the nut and bolt are securely held in tightened position under compression this force being effectively maintained as long as the tongues are threadedly engaged with the bolt in the position shown in Fig. 6.

It should be noted that the tongues normally extend substantially at right angles to the axis of the screw upon initial application of the nut thereto. Thus, as the screw is tightened the forces spreading the tongues apart are directed along the tongues in planes normal to the axis of the screw and through the bends 12 tend to flatten the bowed base portion. When the screw is tightened the free ends of the tongues will lie closer to the base than the remainder of the tongues and the lines of force then set up are such as to substantially flatten and hold flattened the base portion whereby the resilient forces aforementioned assure the locking of the nut on the screw to prevent loosening of the screw and nut.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a nut, a resilient base portion having an opening for reception of a bolt or like screw threaded fastening member, and resilient tongues formed by bending back opposite end portions of said base portion and extending such bent back portions over the base portion with their free ends spaced apart for reception therebetween of a screw threaded fastening inserted through said opening, said base portion being bowed outwardly between the points where the tongues are in continuity with opposite ends thereof, said tongues being inclined and positioned to dispose the free ends thereof at the proper helix angle for effecting a screw threaded engagement with said fastening, the base portion and tongues being constructed and arranged so that the free ends of the tongues will flex inwardly to lie closer to the base portion than the remainder of the tongues and bite into the fastening when the latter is screwed up through the nut, while said bowed base flattens under the force exerted by the inward flexing of said tongues.

2. In a nut, a resilient sheet metal plate-like base having an opening therein through which a screw-threaded fastening may be freely inserted and removed without threaded contact with the base, and resilient sheet metal tongues formed by bending back opposite terminal portions of the base so that such bent back portions overlie the base with their free ends spaced apart over the opening in the base, said free ends being arranged to have screw-threaded engagement with said fastening when the latter is turned therebetween; there being arcuate bends at the juncture of said base and said tongues such that the axes of the tongues in a direction towards said free ends are substantially normal to the axis of the fastening upon initial application of the nut thereto, said base being normally bowed outwardly so that only the extremities thereof next adjacent said bends will initially contact the member against which the nut will rest during the tightening of the fastening; the base, bends and tongues being so relatively arranged that as the fastening is tightened the portion of the bowed base around the opening therein and the free ends of the tongues will be flexed inwardly and lie closer to one another than the remainder of the tongues and base when the fastening is tightened.

RONALD EDGAR EGGERT.